United States Patent [19]

Sabat

[11] 4,127,210
[45] Nov. 28, 1978

[54] MASTER CYLINDER RESERVOIR

[75] Inventor: Arthur G. Sabat, Warren, Mich.

[73] Assignee: Chrysler Corporation, Highland Park, Mich.

[21] Appl. No.: 778,309

[22] Filed: Mar. 16, 1977

[51] Int. Cl.² .................. B65D 25/04; F15B 7/10
[52] U.S. Cl. ................................ 220/22; 60/562; 60/588; 60/592
[58] Field of Search ............... 60/535, 562, 585, 588, 60/589, 592; 137/265, 573, 574, 576, 590.5; 138/42; 220/22

[56] References Cited

U.S. PATENT DOCUMENTS

| | | | |
|---|---|---|---|
| 1,177,075 | 3/1916 | Weston | 137/576 |
| 1,422,674 | 7/1922 | Cook | 137/576 |
| 3,051,453 | 8/1962 | Sluijters | 138/42 |
| 3,879,947 | 4/1975 | Gaiser | 60/535 |
| 3,978,670 | 9/1976 | Kruse | 60/562 |
| 3,989,056 | 11/1976 | Reinartz | 137/265 |

FOREIGN PATENT DOCUMENTS 937,991  12/1955  Fed. Rep. of Germany ........... 137/265

Primary Examiner—Martin P. Schwadron
Assistant Examiner—Abraham Hershkovitz
Attorney, Agent, or Firm—Baldwin & Newtson

[57] ABSTRACT

Master cylinder reservoir comprising a housing having two adjacent reservoir sections separated by a transversely extending double wall partition having windows offset laterally from one another with a space between the walls.

4 Claims, 3 Drawing Figures

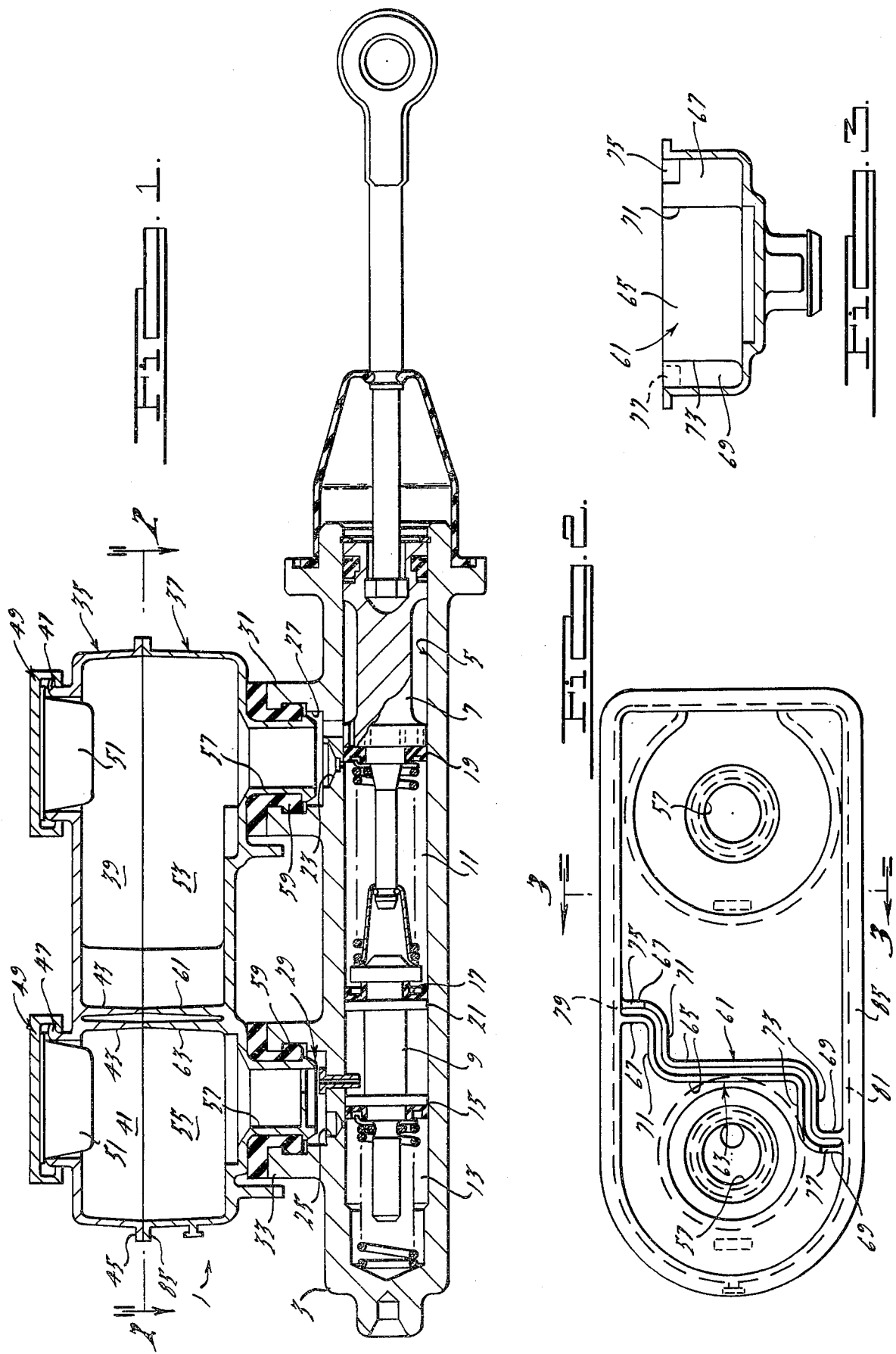

MASTER CYLINDER RESERVOIR

BACKGROUND OF THE INVENTION

This invention relates to improvements in brakes, and more particularly to a reservoir for a master cylinder for the hydraulic brakes of a motor vehicle.

One type of master cylinder system and the type to which this invention relates is commonly referred to as a split system or tandem master cylinder system. A master cylinder in such a system has a reservoir above it to provide the additional fluid needed as the brake shoes wear, for example, and has distinct and separate connections to two sets of brakes, such as to the rear wheel brakes and the front wheel brakes, or to two sets of brakes each set of which includes one front wheel brake and one diagonally located rear wheel brake. The reservoir is conventionally divided into two chambers, one for the primary piston chamber (for one set of brakes) and one for the secondary piston-chamber (for the other set of brakes). If one set of brakes malfunctions in such a way that a drop in hydraulic pressure occurs in such set, the other set will continue to operate.

Various types of reservoirs with different partitioning arrangements are shown in U.S. Pat. Nos. 3,147,596; 3,194,019; 3,520,136 and 3,731,487. The first three patents show partitions which extend up from the bottom of the reservoir only part way toward the cap or top thereof. These arrangements permit the reservoir to be filled through one inlet as the fluid will eventually flow over the partitions into the other sections of the reservoir. U.S. Pat. No. 3,731,487, shows a partition which, except for a pressure bleed-through passage, completely blocks communication between two sections of a reservoir. In such an arrangement the reservoir cover is completely removed when hydraulic fluid must be added.

One of the problems encountered with reservoirs having partial partitions occurs during braking deceleration periods. Under these conditions fluid tends to slosh over the partition due to the build-up of the fluid toward the front of the particular section of reservoir. For example, during a one G deceleration, the surface of fluid in a reservoir section will extend at a 45° angle and fluid will tend to flow from the rearward section to the forward section. If the rear brake system should develop a leak, for example, the supply of fluid in the front reservoir sections, from which fluid is supplied to such systems would gradually be depleted. During each braking operation, the fluid from the rear reservoir section, would flow over the partition into the front section. Thus, not only would the rear brakes eventually be rendered ineffective due to the loss of fluid from the rear brake system, but the front brakes would eventually be rendered ineffective due to the depletion of fluid in the rear reservoir. Similar situations could be presented under acceleration conditions, during cornering manuevers and with vehicle vibration. Obviously, such situations are not desirable.

A copending coassigned application, Ser. No. 778,893 filed on Mar. 18, 1977, claims a reservoir adapted to overcome many of the shortcomings of reservoirs of the type described above. The present invention is an improvement over the apparatus claimed in the aforenoted application.

BRIEF SUMMARY OF THE INVENTION

Briefly, this invention comprises a master cylinder reservoir having first and second reservoir sections separated from one another by a double partition having laterally offset windows therein, the partition having transversely and longitudinally extending sections arranged to retain fluid in said sections under various acceleration, deceleration and cornering conditions.

One of the primary objects of this invention is to provide a fluid reservoir for a master cylinder, which reservoir inhibits sloshing of fluid from one section to another during deceleraton and acceleration periods.

Another object of this invention is to provide a reservoir such as described which not only inhibits sloshing of fluid during periods of fore and aft acceleration and deceleration, but also inhibits such sloshing when going around corners, for example.

A further object of this invention is to provide a reservoir of the type described in which the sloshing of fluid is inhibited, but in which both sections can be filled by the addition of the fluid to one section through one inlet.

Another object of this invention is to provide a reservoir of the type described which provides an improvement in fluid retaining capabilities over apparatus claimed in the aforenoted application.

Still a further object of this invention is to provide a reservoir such as described which is economical in construction and efficient in operation.

Other objects and advantages will be made apparent as the description progresses.

BRIEF DESCRIPTION OF THE DRAWINGS

In the accompanying drawings, in which one of various possible embodiments is illustrated.

FIG. 1 is a sectional view of a master cylinder having one embodiment of a reservoir of this invention mounted thereon;

FIG. 2 is a longitudinal horizontal section taken through the reservoir shown in FIG. 1 along lines 2—2; and FIG. 3 is a section taken along lines 3—3 of FIG. 2;

Like parts are indicated by corresponding reference characters throughout the several views of the drawings.

DESCRIPTION OF THE PREFERRED EMBODIMENTS

Referring now to the drawings, one embodiment of a reservoir constructed in accordance with this invention is generally indicated at 1 and is mounted on a master cylinder 3. The master cylinder 3 is generally tubular in shape and has a central base 5 in which a primary piston 7 and secondary piston 9 are located. Suitable ports (not shown) are provided to permit the ingress and egress of hydraulic fluid from chambers 11 and 13 in base 5. Seals 15, 17 and 19 are provided on the pistons, but it will be noted that there is no seal immediately forwardly of an annular shoulder 21 formed on secondary piston 9.

Compensation ports 23 and 25 extend through the wall of tubular master cylinder 3 and place the base 5 in communication with annular recesses 27 and 29 formed by annular rims 31 and 33 on the tubular master cylinder 3.

The reservoir 1 includes an upper cover portion 35 and a lower fluid carrying portion 37, both of which may be formed of plastic material or a die cast metal.

Upper cover portion 37 has two sections 39 and 41 separated by downwardly extending partitions 43, the construction and purpose of which will be made apparent hereinafter. A flange 45 extends completely around the periphery of the upper cover portion 37.

Each section has a neck 47 over which a cap 49 is placed. Suitable sealing diaphragms 51 are clamped between caps 49 and necks 47 to prevent leakage of hydraulic fluid from the reservoir through the necks 47.

The lower fluid carrying portion 37 includes two reservoir sections 53 and 55 each of which includes a downwardly extending sleeve 57 adapted to extend into recesses 27 and 29 in the master cylinder. Seals 59 prevent leakage of fluid from the joint formed by the sleeves and master cylinder recesses.

The reservoir sections 53 and 55 are separated by partitions or walls 61 and 63 extending transversely from one side of the reservoir to the other and spaced slightly from one another throughout their lengths. The partitions 61 and 63 each include an elongated central transversely extending section 65, with short transversely extending end sections 67 and 69, and axially extending connecting sections 71 and 73 joining the sections 67 and 69 with Section 65.

The partitions 43 are formed generally as mirror images of the partitions 61 and 63 thus far described with the upper edges of the partitions 61 and 62 engaging the lower end of partitions 43 to complete the barrier between the reservoir sections. However, each partition 61 and 63 has a cut out or notch 75 and 77 therein adjacent opposite side walls of the reservoir, i.e., partition 61 is notched adjacent wall 79 and partition 63 is notched adjacent wall 81. The lower fluid carrying portion 37 has a flange 85 extending therearound which is sealed by heat, for example, to flange 45. Similarly, the upper edges of partitions 61 and 63 are sealed to the lower end of downwardly extending partition 43. Thus, the barriers have two windows offset across the reservoir from one another.

The reservoir sections 53 and 55 each have a annular lip extending upwardly around the sleeves 47 to provide a slight increase in the reservoir capacity around such sleeves in the event a substantial fluid loss should occur.

If it is desired to fill the reservoir it may be done through either or both the necks 47. When the level in one section reaches the level of the window in the adjacent partition, fluid will spill over and fill up the space between the partitions and then flow through the other window into the other reservoir section.

Assuming a fluid leak has occurred in the line to which the reservoir section 55 is connected via chamber 13, the fluid in the section 55 will be depleted. When the vehicle driver applies the brakes during forward movement, the brakes supplied with fluid from reservoir section 53 will still be operable and the vehicle will decelerate. As the vehicle decelerates, the fluid in section 53 will tend to pile up against the partition 61, the amount being dependent upon the amount of fluid in the section and the rate of deceleration. However, until the leading edge of the fluid reaches the level of window 75, none of the fluid will be lost from the section. Inasmuch as the partition 61 includes the sections 69, 73, 65 and 71, considerably more volume is provided for fluid retention during deceleration than would be provided if the partition extended across the reservoir in a direction perpendicular to the walls 79 and 81 or in a straight line angled direction relative to the walls. Thus, an ample supply of fluid will be retained in the reservoir section even under repeated rapid decelerations.

Even if the leading edge of the fluid in reservoir section 61 rises above the lower level of the window 75 fluid will first flow therethrough into the space between the partitions 61 and 63. The level of fluid in the space between the partitions will normally be at or near the level of the lower edge of the windows 75 and 77. Accordingly, fluid flowing from section 53 through the window 75 will first fill up the space between partitions and below the window level, if necessary, and only then flow through window 77 into section 55. The fluid must thus flow through the tortuous path provided by the partitions, thus inhibiting the rapid transfer of fluid from one reservoir section to another. This fluid flowing into secton 55 will help maintain a sufficient amount of fluid in such section, if the leak is very small, to permit continued operation of the brakes supplied with fluid from section 55, while at the same time, a sufficient amount of fluid is maintained in section 53 to permit operation of the brakes supplied with fluid from such section.

If the leak in the line supplied with fluid from chamber 55 is major, and the fluid therein is completely depleted, the partitions 61 and 63 prevent the immediate escape of any significant amount of fluid from the Section 53. The loss of pressure in the lines connected to chamber 13 and chamber 55, will actuate a signalling switch (now shown) to alert the vehicle driver to the failure in such lines. However, the remaining set of brakes continue to operate due to the fluid retention provided by the partitions.

The partition and window arrangement of this invention also prevent the escape of fluid from one section to another during cornering maneuvers. It will be seen that when the vehicle is making either a left or right turn as soon as the level of fluid adjacent the window 77 or 75, respectively, is below the window, no fluid will flow from one reservoir section to another. Should the brake lines to which fluid is supplied from reservoir section 53 develop a leak, causing depletion of the fluid in such section, fluid will be maintained in the forward section 55 during accelerations and cornering maneuvers in a manner similar to that discussed above. It is well known that more fluid must be available to front wheel disc brakes than to rear wheel drum brakes. Hence, a larger reservoir section 53, as shown is appropriate for such a situation. In view of the foregoing it will be seen that the other objects and advantages of this invention are achieved.

Although only one embodiment of the invention has been disclosed and described, it is apparent that other embodiments are modifications of the invention are possible.

I claim:

1. In a reservoir for the master cylinder of a vehicle hydraulic brake system, said reservoir having a lower fluid carrying portion, an upper cover portion secured to said lower fluid carrying portion and a set of spaced dividers extending substantially transversely from one side wall of said reservoir to the other side wall thereof forming two reservoir sections, said set of dividers comprising a first and second wall, said dividers having an opening in each wall offset from the opening in the other wall; each of said walls having an elongated transversely extending central portion, first and second intermediate portions extending perpendicularly with respect to opposite ends of said central portion, and first and second end portions extending transversely between said intermediate portions and each of said side walls to thereby provide a tortuous path for the fluid transfer between the two reservoir sections.

2. In a reservoir as set forth in claim 1 wherein said openings are in one end portion adjacent one side wall of said reservoir and another end portion adjacent the other side wall of said reservoir.

3. In a reservoir as set forth in claim 2 wherein said walls and openings are located to provide a fluid retaining pocket between said walls even though the level of fluid in one reservoir section is higher than the opening through said wall.

4. In a reservoir as set forth in claim 3 where said dividers further comprise: first and second partitions extending from said lower fluid carrying portion towards said upper cover portion, and third and fourth partitions extending from said upper cover portion towards said lower fluid carrying portion, and engaging said first and second partitions so as to form said first and second walls.

* * * * *